No. 735,640. PATENTED AUG. 4, 1903.
R. O. WIGLEY.
SPROCKET TOOTH.
APPLICATION FILED APR. 23, 1903.

NO MODEL.

WITNESSES:
Jos. A. Ryan
Edw. W. Byrn

INVENTOR
Robert Oscar Wigley.
BY Munn & Co.
ATTORNEYS.

No. 735,640.

Patented August 4, 1903.

UNITED STATES PATENT OFFICE.

ROBERT OSCAR WIGLEY, OF BREWTON, ALABAMA.

SPROCKET-TOOTH.

SPECIFICATION forming part of Letters Patent No. 735,640, dated August 4, 1903.

Application filed April 23, 1903. Serial No. 153,997. (No model.)

*To all whom it may concern:*

Be it known that I, ROBERT OSCAR WIGLEY, of Brewton, in the county of Escambia and State of Alabama, have invented a new and useful Improvement in Sprocket-Teeth, of which the following is a specification.

In sprocket-wheels, and especially those of large size for heavy work, the sprocket has been made as a detachable piece of steel removably secured to the web or central portion of the wheel by means of a bolt. This old sprocket consists of a fork or link-seat, which receives the link of the chain belt, a central tongue located in the middle of the fork and adapted to enter the link, and a shank portion which entered a socket of the wheel and was secured by a bolt passing through said shank and the web of the wheel, all these parts of the sprocket being made of one piece and being integrally removable from the wheel.

My invention consists in making the central tongue of the sprocket detachable from the fork portion and securing it within a socket of the fork portion by the same bolt which fastens the sprocket to the wheel. By this construction I make a great saving in sprockets, for as the pulling strain and wear come only on the central tongue it is only necessary to renew the tongue from time to time or to take it out and turn it around without having to cast away or change the position of the entire sprocket.

Figure 1:
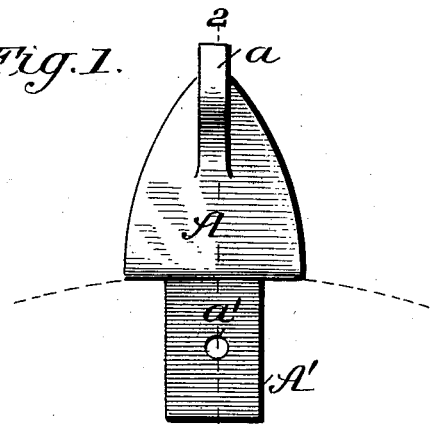
Figure 2:
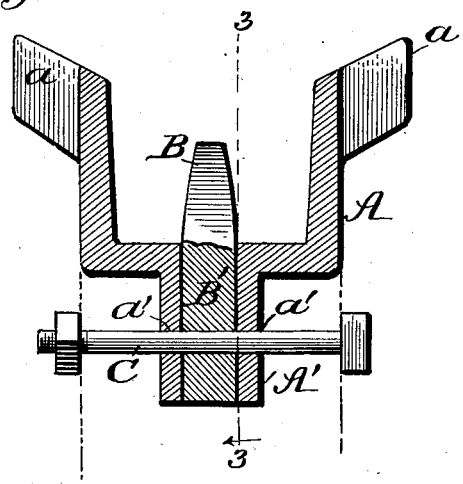
Figure 3:
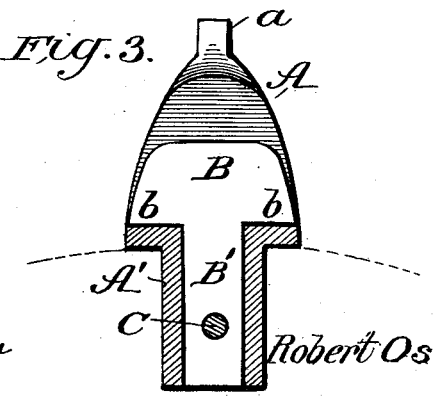

In the drawings, Figure 1 is a side view of my improved sprocket. Fig. 2 is a longitudinal section through the same along the line 2 2 of Fig. 1; and Fig. 3 is a section taken at right angles to Fig. 2 and along the line 3 3 of Fig. 2, the connecting portion of the web of the wheel being shown in dotted lines in each of the figures.

A represents the fork or link-seat of the sprocket, whose shank portion A' is made hollow to form a square or rectangular socket.

B is the central tongue, having a shank portion of a cross-section corresponding to that of the socket and fitting snugly therein. The socket-shank A' of the fork has a transverse perforation a' through it, and the tips of the fork have divergent wings or horns a a. The tongue B is spread out at its base to form shoulders b b, which rest upon the base of the fork and give a broad bearing to prevent tilting and to resist the pulling strain, and the middle of the tongue is extended between these shoulders downwardly to form the shank B', that fits within the socket portion A' of the fork. This shank portion of the tongue is perforated transversely in alinement with the holes a' of the socket, and through these coinciding holes a bolt C is passed, which firmly clamps both parts of the sprocket to each other and also to the periphery of the wheel. (Shown in dotted lines.) It will be seen that the one bolt is thus made to do double duty. Experience has shown that only the central tongue of the sprocket is subjected to serious wear. If now from the constant pull and chafing of the chain against one side of the tongue it becomes worn, the tongue is removed and turned around, so as to bring a fresh side to bearing contact with the chain, and when both sides of the tongue become worn only the tongue needs to be removed and another put in its place without sacrificing the value of the forks or link-seats. This secures a great economy in sprocket-wheels, as well as avoids weakness in the casting, due to inherent strains produced by the unequal cooling of the sprocket when all cast in one piece.

Having thus described my invention, what I claim as new, and desire to secure by Letters Patent, is—

1. A two-part detachable sprocket for a chain-wheel, comprising a fork or link-seat having a socket in its center, and a central tongue removably fixed therein substantially as described.

2. A two-part detachable sprocket for a chain-wheel, comprising a fork or link-seat made with a central socket, and a detachable central tongue having a shank fitting in said socket and means for securing it substantially as described.

3. A two-part detachable sprocket for a chain-wheel comprising a fork or link-seat made with a central socket having a transverse hole, and a central tongue having a shank with a transverse hole coinciding with that of the socket and means for securing the two together substantially as described.

4. A two-part detachable sprocket for a chain-wheel comprising a fork or link-seat and a central tongue removably fixed therein, said tongue having shoulders forming a wide base-bearing and means for locking the tongue in the link-seat substantially as and for the purpose described.

5. A sprocket comprising a fork or link-seat made with a central socket having a transverse bolt-hole, a central tongue having a shank with a transverse bolt-hole, and a bolt passing through and securing both the socket and the shank substantially as and for the purpose described.

ROBERT OSCAR WIGLEY.

Witnesses:
WILLIAM H. HARPER,
EDWIN T. PARKER.